Jan. 20, 1931.  L. H. ENGLUNG  1,789,334
METHOD AND APPARATUS FOR MAKING INFUSIONS
Filed May 21, 1929
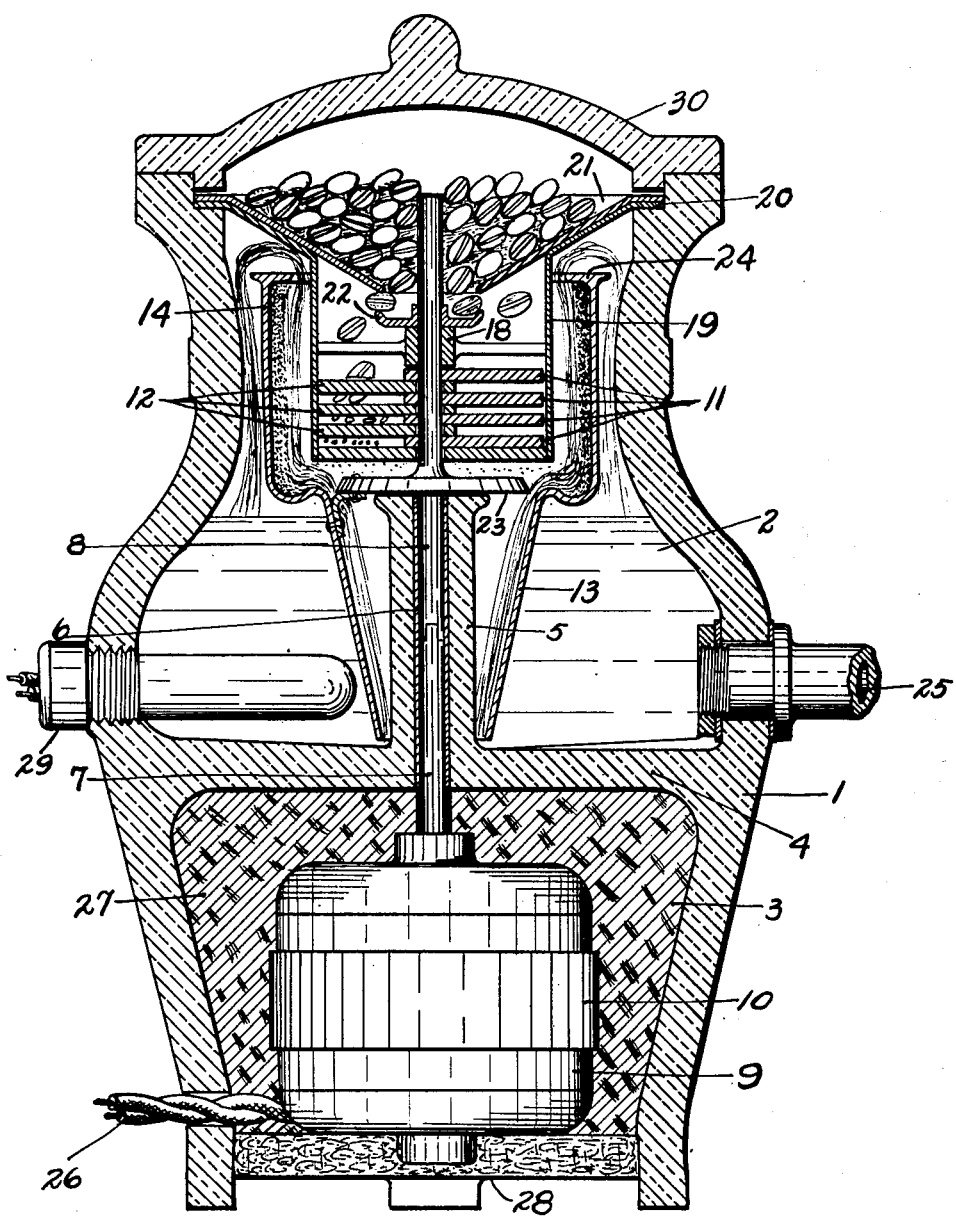
INVENTOR.
Leonard H. Englund
BY
H. P. Van Deventer
ATTORNEY Patented Jan. 20, 1931

1,789,334

UNITED STATES PATENT OFFICE

LEONARD H. ENGLUND, OF WINONA, MINNESOTA

METHOD AND APPARATUS FOR MAKING INFUSIONS

Application filed May 21, 1929. Serial No. 364,721.

This invention relates to an improved method and apparatus for making coffee or other infusion beverages.

Objects of this invention are: storage after roasting, in the form of unbroken kernels or berries; extraction at the instant of pulverization; absorption and solution of all volatile constituents (which comprise the very essence of flavor) at the instant of pulverization and before diffusion into the atmosphere; extraction by means of water at a temperature range between 185° F. to 195° F., (water at 212° F. drops to this range on being poured into the apparatus), extraction in water which is aerated; short period of contact of water with pulverized coffee, preventing the solution of tannin, glucosides, and other compounds of astringent, bitter or deleterious effect, since these substances are not as rapidly soluble as the flavoring essences; application of effective force to separate the beverage from the residue.

In my process, the unbroken berries are pulverized into an impalpable powder during the space of a few seconds' time; simultaneously this powder is entrained in a spray of water so that the extraction begins instantly, preventing any loss of the volatile oils and essences, (which are ordinarily lost in the atmosphere of the room as "aroma" when ground in a coffee mill in the ordinary way). An instant later this slurry of pulverized coffee and water reaches the solid curb of a centrifugal basket, where the insoluble residue of the kernel builds up as a layer or cake, while the high speed spray of water or solvent permeates the mass coming in contact with the entire surface of the minutest particles, after which the centrifugal force drives it upwardly along the solid curb of the basket to the top, where it is thrown off into the reservoir of the urn, thus effecting clarification or separation from the residue.

The water being broken up by centrifugal force forms a spray, which becomes aerated due to the presence of air in the vessel, and any "aroma", as mentioned above, would also be taken up by this spray. This aeration makes the beverage more palatable, whereas in an ordinary percolator the longer the percolating action the more air is taken out of the solution, giving a "flat" taste.

The extremely fine division of the coffee berry and the entrainment in the spray of water makes possible the almost instant solution of the flavoring constituents in a degree approaching 100%, while the separation or clarification a fraction of a second later on the solid curb of the centrifugal basket effectively prevents hydrolysis of glucosides and subsequent solutions of the derivatives and other deleterious, slowly soluble substances. The effective power of centrifugal force removes most of the solution from the residue.

By my process, the beverage produced, contains the maximum of soluble flavoring constituents, with a minimum trace of tannin and other undesirable constituents mentioned above. It is of very highest quality, has a delicious taste and flavor, and is produced at a maximum rate of yield.

The essentials of my apparatus comprise, a vessel or container for liquid; a hopper or receptacle for coffee berries or kernels; a means for pulverizing or grinding the coffee berries; a means for producing a spray of liquid; a solid curb centrifugal basket for clarifying the beverage and a source of power for driving the above mentioned means.

In the preferred form of my apparatus, referring to the drawing, a vessel 1 made preferably of vitrified pottery has an upper compartment 2 and a lower compartment 3, separated by a wall or partition 4. Extending vertically from 4 is a hollow tubular section 5, which is lined with a metallic sleeve 6, forming a journal for the shafts 7 and 8. An electric motor 9, (retained by a support 10, which may be attached to the vessel 1) is mounted in the lower compartment 3 and its shaft 7 runs in the journal 6 and is flexibly connected to the shaft 8 hereinafter described. Of the many kinds of grinders or pulverizers known, I prefer to use the type known as a hammer mill which has a number of metal pieces or hammers 11, fixed to the shaft 8 and disposed around the circle of travel in any arrangement desired. These rotating hammers run between or adjacent to the stationary members 12 and grind or pulverize the coffee beans. My reason for using this type of mill is that it may be operated at the high speed that I use for driving my vertical cone 13 for producing spray and movement of the liquid, upward over the inner surface of the solid curb basket 14, utilizing the shaft 8 to rotate the hammers 11, the cone 13 and the basket 14 all at the same speed. As mentioned before shaft 8 journals in the sleeve 6 and its upper end journals in the bearing 18. This bearing 18 and the stationary members of the mill 12 are carried by the member 19 which is cylindrical in its lower part and conical in its upper part, the said upper part being supported in the annular depression 20 in the top of the upper compartment 2. Fitting into this same depression 20, I have a funnel shaped receptacle 21 into which the coffee beans are placed. To prevent the coffee from choking the mill before it gets up to speed, the rotating baffle 22 is fixed on to the shaft 8. When this shaft gets up to speed the coffee beans that are in contact with the baffle 22 are slung out by centrifugal force and fall down into the mill, this action continuing until the funnel member 21 is empty. The pulverized coffee falls to the rotating disc 23 where it is slung out into the stream of liquid and spray passing upward along the wall of the cone 13 and solid curb basket 14 where the extraction and clarification is accomplished, the residue being deposited on the inner wall of the basket 14 and the liquid passes, by centrifugal force, over the ledge 24 on upper extremity of the basket 14, the liquid and spray falling back to the main body of liquid in the chamber 2. This action continues as long as the apparatus is operating. If necessary, screens can be inserted at the top and bottom of the basket 14 to prevent the ground coffee from finding egress to the main body of liquid.

The beverage may be drawn out through the spigot or cock 25. The current is supplied to the motor through the wires 26. The motor compartment may be filled with insulation 27 and the bottom is padded with a fibrous material 28, to prevent noise and vibration, or the motor may be arranged and ventilated in any suitable manner. Any suitable means may be employed to heat the liquid if desired, such as the usual immersion heater 29.

It will be observed that the entire mill and basket 14 and attached parts may be readily removed from the top of the vessel for cleaning or repairs.

The embodiment of the invention herein described is particularly suited for household use where a small inexpensive device, easily portable and cleaned, is necessary, but many modifications can be made therein without departing from the appended claims herein, and while this method and apparatus is shown as applied to making coffee beverage, it may be used for many other purposes.

What is claimed is:

1. In a coffee making apparatus, the combination with a vessel, of an electric motor having a shaft, a grinding or pulverizing mill driven thereby and having a shaft removably connected to said motor shaft, a centrifugal separator driven by said motor, said mill and separator being removable from said vessel without disturbing the motor.

2. In a coffee making device the combination of a vessel having an upper and lower compartment, a fluid tight partition separating the compartments, having bearing support therein, a shaft in said support, a motor in the lower compartment connected to said shaft, a grinding or pulverizing mill in the upper compartment driven by said shaft, a centrifugal separator surrounding said mill and adapted to receive the discharge into said mill and means to cause a circulation of liquid through said separator.

3. The combination with a device as claimed in claim 1 of a suitable heating device positioned in the vessel and adapted to contact with the liquid therein.

In testimony whereof I affix my signature.

LEONARD H. ENGLUND.